May 22, 1928.

G. ANDERSON

SAW SET

Filed April 27, 1926

INVENTOR
Gustaf Anderson

Patented May 22, 1928.

1,670,949

UNITED STATES PATENT OFFICE.

GUSTAF ANDERSON, OF SEATTLE, WASHINGTON.

SAW SET.

Application filed April 27, 1926. Serial No. 104,998.

This invention relates to saw sets and more particularly to that class of saw sets wherein the saw set itself is grasped by the operator so as to position the device in operative relation to the saw blade, and a blow struck with a hammer by the operator. The principal object of my invention is to provide vertically adjustable, flexible means for supporting the tool in a pre-determined position with respect to the saw teeth being dealt with so that uniformity in the set of the saw teeth results, an important feature of this phase of the invention being to prevent injury to the saw teeth points which has heretofore been caused by vibration of the saw blade during the setting operation.

A further object is to provide means which cooperate with supporting means, for varying the angle in the set of the saw teeth so that the teeth may not be subjected to a point beyond the temper of the saw teeth to withstand. This is especially true where highly tempered saws are being dealt with.

A further object is to provide manually controlled mechanism for moving the operating surfaces to and from each other, prior to the striking operation so that the equivalent of a direct hammer blow on the saw teeth results, which, as it will be understood, is more effective for the purpose than a clattering blow, as when one of the operating members is normally spaced away from the saw tooth at the time the blow is struck.

A still further object is to simplify the general construction of the device so as to produce a cheaper and more effective tool of this class than those which have heretofore been known in the art so far as I am aware:

In the accompanying drawings, illustrating my present invention and forming a part of this specification;

Figure 1:
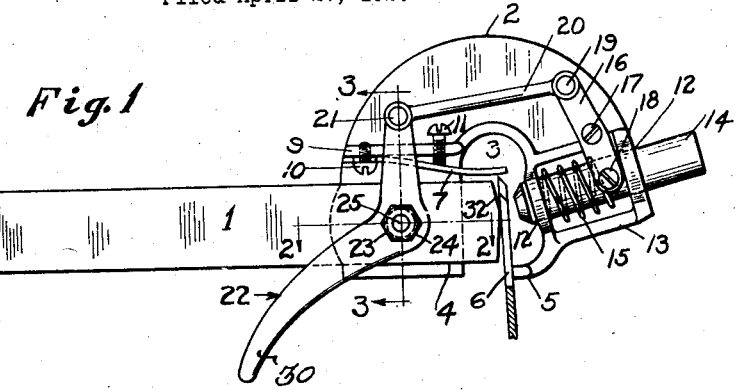
Fig. 1 is a side elevation of the device in operative position and showing a fragment of a saw tooth.
Figure 5:
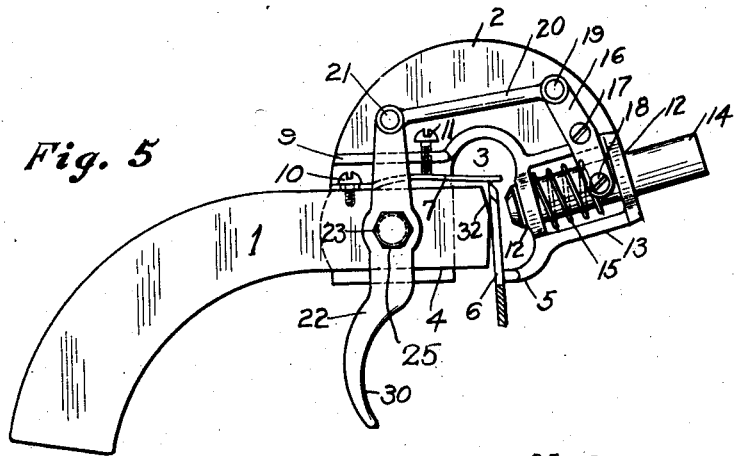
Fig. 5 is a side elevation showing a slight modification.
Figures 2, 3:
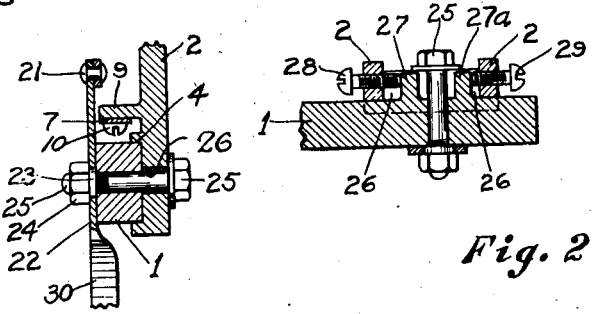
Fig. 2 is a detail horizontal sectional view on the line 2—2 of Fig. 1.
Fig. 3 is a detail transverse sectional view on the line 3—3 of Fig. 1.
Figure 4:
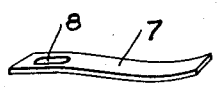
Fig. 4 is a perspective view of the gauge plate.

Referring now more particularly to the drawings, reference numeral 1 indicates the stock or handle portion which is preferably of such formation as to conveniently fit in the hand of the operator. A bracket 2 I prefer to have in an upwardly arched formation, as shown. 3 indicates a cut-out portion in the bracket, one of whose sides has a slideway 4 in which is placed the stock 1, as seen in Fig. 3; the lower extremity 5 of the other side of the bracket forms a part of the gauging mechanism presently to be more fully described. A saw tooth 6 is shown in Figures 1 and 5 in position to be operated upon. A gauge plate 7 having in its outer end a slot 8 and which I prefer to employ in the form of a leaf spring, may be secured either to the stock 1 as shown in Figure 5 or to an overhanging lateral extension 9 of the bracket 2 as shown in Figure 1 preferably by means of a screw 10, as seen in Figs. 1 and 5. Another screw 11 which passes through a threaded opening in the extension of the bracket may be advanced or withdrawn so as to tension the leaf spring 7 and to cause its free end to either rise or descend. Extending through apertures 12 in another lateral extension 13 of the bracket and freely slidable therethrough, is a plunger 14, the plunger being urged to the right as seen in Figs. 1 and 5, by means of a helical spring 15. A lever 16 is pivoted at 17 to the bracket 2 and a screw 18 passes loosely through the lower extremity of the lever 16 and enters the plunger 14 so that that extremity of the lever forms a limit stop for the outward movement of the plunger 14. Pivoted at 19 to the upper extremity of the lever 16 is a link 20, the opposite end of the link being pivoted at 21 to the upper extremity of a trigger 22. The trigger is pivoted upon a reduced circularized portion 23 of a nut 24 on a threaded bolt 25 which passes through one end of the stock 1 and also through an elongated slot or channel 26 in the bracket 2, as best seen in Fig. 3. In the slot 26 are two stop-pins or lugs 27 and 27ª as rigid or integral parts of the stock 1, which are spaced apart to leave room for the bolt 25 therebetween as seen in Fig. 2. Screws 28 and 29 pass through a threaded portion of the bracket 2, so that when the stock 1 is moved in either direction with respect to the bracket, which of course is allowed, due to the elongated slot 26, until the desired position is reached, the screws 28 and 29 may be advanced toward the respective stop-pins or lugs until the latter be firmly gripped by the screws and held in a rigid and firm position with respect to the bracket 2, and thereby locking the adjustment of the bracket 2 on the stock 1 as shown in Fig. 2, for preventing all possibility of the bracket and its lower extremity 5, which forms a part of the gauging mechanism, from shifting on the stock through re-action on the bracket when blows are being struck on the outer end of the plunger 14 for setting the saw teeth against the oblique face of the stock 1. 30 indicates the lower extremity or finger piece of the member 22. The inner end of the stock 1 is provided with an oblique face indicated at 32 which is hardened to a suitable temper. When the stock is adjusted as just described, the nut 24 may be tightened upon the threaded bolt 25 as will be understood.

The operation of the device is that the saw blade 6 is first grasped by the clamping means of a filing bench, not shown. The desired set or pitch of the saw teeth being first determined by the operator, the stock is adjusted as already fully described, and also the gauging end of the leaf spring 7 is adjusted to a predetermined level. The device is now placed in position with respect to the saw teeth as plainly shown in Fig. 1 with the free end of the leaf spring resting upon the point of the saw tooth, the cut-out portion or opening 3 and the extension 13 for holding the plunger 14 extending laterally from the bracket 2, forms a view space allowing the operator full and easy inspection of the inner end of the plunger and its contact with the saw teeth from an operation view point. The device is now tilted or canted so that the extremity 5 of the bracket contacts with the rut portion of the tooth and the upper extremity of the stock 1 contacts with the approximate upper extremity of the tooth. The operator then moves the trigger 30 toward him, about its center of movement 23, which of course, through the link 20 and the lever 16, causes the plunger 13 to move toward the saw tooth against the action of its spring 15. The inner extremity of the plunger is now being held snugly against the side of the saw tooth and the opposite side of the tooth snugly pressed against the inner end of the stock 1. The operator now strikes a blow upon the outer end of the plunger 14 which will force the upper end of the saw tooth in the direction of the blow and cause it to be moved out of the vertical plane of the saw blade to an extent equal to the oblique surface 32 of the stock 1.

From the foregoing it will be seen that the teeth will all have exactly the same set and that the chances of breakage of the teeth are reduced to a minimum. It will also be seen that by adjustment of all the parts as already described, any set and angularity of the teeth may be attained. It will also further be seen that little or no vibration of the saw tooth being set occurs during the operation, so that the saw teeth may be set without injuring their points.

In reference to the trigger mechanism, it will be understood that with the plunger 14 held snug against a saw tooth, a hammer blow on the plunger is more effective for the purpose than when normally spaced away from the saw tooth by the retracting spring 15. The trigger mechanism being connected to the plunger 14 within the housing of the extension 13 allows the plunger to be moved toward the oblique face of the stock 1 independently of other parts of the device and the adjustments thereof. Furthermore, upon inspection of Figures 1 and 5 it will be seen that the whole trigger mechanism is in the form of an attachment that may be detached by manipulating the screws 17 and 18 and the nut 24, should there be any reason for doing so, and the main tool still remaining intact with its parts in adjusted position.

Fig. 5 shows the stock 1 having a pistol grip. The leaf spring 7 is secured to the stock 1. The bolt 25 is reversed end for end and the circularized bearing 23, on which the trigger 22 is pivoted, is formed on the head of the bolt as shown in a dotted line. These features are all equivalent to those shown in the other figures.

It is to be noted that heretofore all saw sets of the block and hammer type have had their supporting means resting upon sections of saw teeth adjacent to the one of which a tooth is being set. Such sections of teeth are always subject to vibration when a blow is struck on the swager or plunger of such devices. Vibration injures the points of the saw teeth when a heavy tool like a saw set of this type rests upon them. In the present instance it will be seen in Fig. 1 that the gauging, or supporting member, rests upon the same saw tooth that is being set, and further, that saw tooth is being held firmly within the set as shown and therefore cannot vibrate when the plunger is being struck with a hammer. I consider this the most important feature, for with moderate care a saw may be re-set even after the teeth have been sharpened without injuring the points of the teeth when such an operation becomes necessary.

While I have shown a particular form of embodiment of my invention, I am aware that many minor changes therein will readily suggest themselves to others skilled in the art without departing from the spirit and the scope of my invention. I therefore desire to avoid being limited to the exact form of embodiment which I have herein shown and described.

Having described my invention what I claim as new and desire to protect by Letters Patent is:—

1. A saw-set comprising a handle having an oblique end face, a substantially U-shaped bracket member thereon so mounted as to be adjustable longitudinally in respect to the handle, a spring-held plunger obliquely mounted in the outer leg of said bracket so as to be substantially perpendicular to the oblique end face of the stock and extendible thereto, a spring gage between the lugs of the bracket so mounted as to limit the entrance of the saw blade and a trigger-actuated compound lever adaptable to bring the plunger into contact with the saw tooth, in which the trigger is fastened to a side of the handle oppositely where the bracket is fast thereto, said trigger being tiltable about the fastening means having a spur on its upper end, a link tiltably connected to the spur, one end of a lever fulcrumed about a point over the plunger and on the bracket, one end of said lever being connected to the link and the other end to the plunger.

2. In a saw set a shank, an inverted U-shaped bracket formed with a pair of transversely extending guide flanges upon one leg and slidably embracing the shank, to permit the bracket to be adjusted longitudinally thereof, means for holding the bracket in adjusted position on the shank, a saw tooth setting anvil disposed between the legs of the bracket, a resiliently urged plunger slidably supported by the other leg in a position where its inner end is opposed to the anvil and normally urged away from the latter, a lever pivotally supported upon one leg of the bracket adjacent the plunger and having one end operatively connected therewith, an actuating lever pivoted intermediate its ends to the shank, and a link operatively connecting the two levers together whereby upon rocking of the operating lever in one direction the plunger will be shifted into engagement with a saw tooth disposed against the anvil.

3. A saw set of the class described, a stock having an oblique face at one end thereof, a bracket slidably mounted on the side of the stock and having a cutaway portion opposite to which said one end of the stock extends, a lateral extension on said bracket in front of said one end of the stock for housing a plunger adapted to coact with the oblique face on the stock, a saw-engaging jaw on said extension beneath said housing, means for adjusting and locking the adjustment of the bracket on the stock to vary the space between said saw-engaging jaw on the bracket and said one end of the stock, and means extending transversely through the stock and a portion of the bracket for securing the bracket to the stock in a pre-adjusted and locked position.

4. A saw set of the class described, a stock having an oblique working face at one end thereof, a bracket slidably mounted on one side of the stock and having a cutaway portion opposite to which said one end of the stock extends, a lateral extension on said bracket in front of said one end of the stock and a plunger housed in said extension adapted to coact with the oblique face on the stock, a saw-engaging jaw on said extension beneath said plunger, means for adjusting and locking the adjustment of the bracket on the stock, means for securing the bracket to the stock in a pre-adjusted and locked position, and means under control of the operator to move said plunger toward and away from the oblique face of the stock and to hold the plunger in such position independently of the pre-adjusted and locked position of the bracket and its saw-engaging jaw.

5. A saw set of the class described, a stock having an oblique working face at one end thereof, a bracket slidably mounted on one side of the stock and having a cutaway portion opposite to which said one end of the stock extends, a lateral extension on said bracket in front of said one end of the stock and a plunger housed in said extension adapted to coact with the oblique face on the stock, a saw-engaging jaw on said extension beneath said plunger, means for adjusting and locking the adjustment of the bracket on the stock, means for securing the bracket to the stock in a pre-adjusted and locked position, and a trigger mechanism under control of the operator to move said plunger toward and away from the oblique face of the stock and to hold the plunger in such position independently of the preadjusted and locked position of the bracket and its saw-engaging jaw.

6. A saw set of the class described, a stock having an oblique working face at one end thereof, a bracket having a slideway and slidably mounted on one side of the stock and having a cutaway portion opposite to which said one end of the stock extends, a lateral extension on said bracket having a spring-retracted plunger adapted to coact with the oblique face on the stock, a saw-engaging jaw on said extension beneath said plunger, means for adjusting and locking the adjustment of the bracket on the stock, means for securing the bracket to the stock in a pre-adjusted and locked position, and a trigger control of the operator to move the plunger individually toward the oblique face on the stock and grasp a saw tooth therebetween, whereby a blow on the plunger sets the tooth at a predetermined angle.

GUSTAF ANDERSON.